(12) United States Patent
Hashimoto et al.

(10) Patent No.: US 11,192,444 B2
(45) Date of Patent: Dec. 7, 2021

(54) DRIVE UNIT FOR A HYBRID VEHICLE

(71) Applicant: TOYOTA JIDOSHA KABUSHIKI KAISHA, Toyota (JP)

(72) Inventors: Hiroto Hashimoto, Atsugi (JP); Hiroaki Kimura, Toyota (JP); Tomohito Ono, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 721 days.

(21) Appl. No.: 15/982,242

(22) Filed: May 17, 2018

(65) Prior Publication Data
US 2018/0334025 A1 Nov. 22, 2018

(30) Foreign Application Priority Data
May 19, 2017 (JP) .............................. JP2017-100111

(51) Int. Cl.
| | |
|---|---|
| *B60W 10/30* | (2006.01) |
| *B60K 11/02* | (2006.01) |
| *B60K 6/48* | (2007.10) |
| *F16N 7/38* | (2006.01) |
| *F16H 57/04* | (2010.01) |
| *B60K 6/365* | (2007.10) |
| *B60K 1/02* | (2006.01) |
| *B60K 6/445* | (2007.10) |

(52) U.S. Cl.
CPC ............... *B60K 11/02* (2013.01); *B60K 1/02* (2013.01); *B60K 6/365* (2013.01); *B60K 6/445* (2013.01); *B60K 6/48* (2013.01); *B60W 10/30* (2013.01); *F16H 57/0412* (2013.01); *F16H 57/0434* (2013.01); *F16H 57/0483* (2013.01); *F16N 7/38* (2013.01); *F16N 2700/00* (2013.01); *F16N 2210/04* (2013.01); *F16N 2270/70* (2013.01)

(58) Field of Classification Search
None
See application file for complete search history.

(56) References Cited

U.S. PATENT DOCUMENTS

| | | | | |
|---|---|---|---|---|
| 6,201,365 B1 * | 3/2001 | Hara | ...................... | H02K 16/00 318/558 |
| 6,323,613 B1 * | 11/2001 | Hara | ...................... | B60L 15/20 318/471 |

(Continued)

FOREIGN PATENT DOCUMENTS

| | | |
|---|---|---|
| JP | 2001238405 A | 8/2001 |
| JP | 2010126047 A | 6/2010 |

(Continued)

*Primary Examiner* — Katy M Ebner
(74) *Attorney, Agent, or Firm* — Hunton Andrews Kurth LLP (57) ABSTRACT

A drive unit for a hybrid vehicle that enables downsizing and cost reduction of an oil supply mechanism to be achieved. The drive unit includes: a first feeding line for supplying a first motor and a differential mechanism with oil discharged from a first oil pump; and a second feeding line for supplying a second motor with oil discharged from a second oil pump, the oil being supplied via an oil cooler that cools the oil. A passage between from the second oil pump to the second motor in the second feeding line and a passage between from the first oil pump to the first motor and the differential mechanism in the first feeding line, are independent of each other.

7 Claims, 5 Drawing Sheets

(56) References Cited

U.S. PATENT DOCUMENTS

| | | | | |
|---|---|---|---|---|
| 6,833,641 B2* | 12/2004 | Uchida | ................. | B60K 6/445 |
| | | | | 310/54 |
| 8,708,855 B2* | 4/2014 | Matsushita | ......... | F16H 57/0413 |
| | | | | 475/159 |
| 9,260,007 B2* | 2/2016 | Sakaguchi | ............. | B60K 11/02 |
| 10,323,632 B2* | 6/2019 | Goto | .................... | F04B 49/022 |
| 10,442,285 B2* | 10/2019 | Tokozakura | ............. | B60K 1/02 |
| 10,465,574 B2* | 11/2019 | Kiyokami | ............... | F01M 5/005 |
| 10,622,869 B2* | 4/2020 | Kiyokami | ............... | H02K 7/116 |
| 2016/0069231 A1* | 3/2016 | Nishimine | ............... | F01M 1/02 |
| | | | | 701/22 |
| 2016/0236748 A1* | 8/2016 | Matsuda | ................. | B60L 3/003 |
| 2016/0265652 A1 | 9/2016 | Nishimine | | |
| 2016/0280215 A1 | 9/2016 | Nishimine | | |

FOREIGN PATENT DOCUMENTS

| | | |
|---|---|---|
| JP | 2016052844 A | 4/2016 |
| JP | 2016168950 A | 9/2016 |
| JP | 2016179727 A | 10/2016 |

\* cited by examiner

| Mode | Operating Condition | Engine | MOP1 | MOP2 | Splashing Lubricating Mechanism |
|---|---|---|---|---|---|
| HV | Running | Stopped | × | ○ | ○ |
| | | Running | ○ | ○ | ○ |
| | Stopped | Stopped | × | × | × |
| | | Running | ○ | × | × |
| EV | Running | Stopped | × | ○ | ○ |
| | Stopped | Stopped | × | × | × |

DRIVE UNIT FOR A HYBRID VEHICLE

CROSS REFERENCE TO RELATED APPLICATION

The present disclosure claims the benefit of Japanese Patent Application No. 2017-100111 filed on May 19, 2017 with the Japanese Patent Office.

BACKGROUND

Field of the Disclosure

Embodiments of the present disclosure relate to the art of a drive unit for a hybrid vehicle in which a prime mover includes an engine, a first motor, and a second motor.

Discussion of the Related Art

JP-A-2010-126047 describes one example of a drive unit for a hybrid vehicle comprising an engine, a first motor, a second motor, a distribution-oriented planetary gear unit, and a speed reduction-oriented planetary gear unit. The distribution-oriented planetary gear unit distributes to the first motor and to an output shaft to which a drive wheel is coupled a driving force generated by the engine. The speed reduction-oriented planetary gear unit transmits to the output shaft, with reduced speed, power of the second motor. The output shaft has transmitted thereto a driving force which is a sum total of driving forces generated by both the engine and the second motor.

An operating mode of the drive unit taught by JP-A-2010-126047 may be selected from a Hybrid Vehicle mode in which the hybrid vehicle is powered by the engine and the second motor, and an Electric Vehicle mode in which the hybrid vehicle is powered by the second motor while stopping the engine.

The drive unit taught by JP-A-2010-126047 includes a lubricating oil supply mechanism in order to prevent abrasion of each section, power loss, or the like. The lubricating oil supply mechanism includes: a first oil pump driven by the engine; a second oil pump driven by a torque transmitted from the output shaft; a first lubricating passage; a second lubricating passage; and a communicating passage.

Oil discharged from the first oil pump is supplied, via the first lubricating passage, to the first motor and to the distribution-oriented planetary gear unit, and oil discharged from the second oil pump is supplied, via the second lubricating passage, to the second motor and to the speed reduction-oriented planetary gear unit. The first lubricating passage and the second lubricating passage are in communication with each other via the communicating passage.

However, there may be a risk that when an amount of oil flowing from the first lubricating passage into the second lubricating passage increases, an amount of oil returned to the first lubricating passage to be supplied again to the first lubricating passage from the first oil pump ends up decreasing. In this case, an appropriate amount of oil cannot be supplied to a place where required. In order to overcome such trouble, in the drive unit taught by JP-A-2010-126047, the lubricating oil supply mechanism has a check valve provided in the communicating passage so that oil flows only from the second lubricating passage into the first lubricating passage. Therefore, the drive unit taught by JP-A-2010-126047 may be increased in size, and its production cost also ends up increasing.

SUMMARY

Aspects of embodiments of the present disclosure have been conceived noting the foregoing technical problems, and it is therefore an object of embodiments of the present disclosure to provide a drive unit for a hybrid vehicle that enables downsizing and cost reduction to be achieved.

The present disclosure relates to a drive unit for a hybrid vehicle including: an engine that generates a driving force; a first motor having an electric power generation function; an output section coupled to a drive wheel; a differential mechanism that distributes to the first motor and to the output member the driving force generated by the engine; and a second motor coupled to the output section and generating a driving force by supply of electric power. In order to achieve the above-described object, the drive unit for a hybrid vehicle according to the present embodiment includes: a first oil pump driven by power of the engine, the first oil pump thereby discharging oil; a second oil pump driven by a torque transmitted from the output section, the second oil pump thereby discharging oil; a first feeding line for supplying the first motor and the differential mechanism with oil discharged from the first oil pump; and a second feeding line for supplying the second motor with oil discharged from the second oil pump, the oil discharged from the second oil pump being supplied to the second motor via an oil cooler that cools the oil. In addition, a passage between from the second oil pump to the second motor in the second feeding line and a passage between from the first oil pump to the first motor and the differential mechanism in the first feeding line, are independent of each other.

In a non-limiting embodiment, the first motor may include: a first rotor shaft; a first rotor that rotates integrally with the first rotor shaft; and a first stator disposed concentrically with the first rotor. The second motor may include: a second rotor shaft; a second rotor that rotates integrally with the second rotor shaft; and a second stator disposed concentrically with the second rotor. The first feeding line may include a first passage that supplies the first rotor of the first motor with oil discharged by the first oil pump. The second feeding line may include: a second passage for supplying the first stator of the first motor with oil cooled by the oil cooler; and a third passage that supplies the second stator of the second motor with oil cooled by the oil cooler.

In a non-limiting embodiment, the first motor may include: a first rotor shaft; a first rotor that rotates integrally with the first rotor shaft; and a first stator disposed concentrically with the first rotor. The second motor may include: a second rotor shaft; a second rotor that rotates integrally with the second rotor shaft; and a second stator disposed concentrically with the second rotor. The first feeding line may include: a fourth passage that supplies the first rotor of the first motor with oil discharged by the first oil pump; and a fifth passage that supplies the first stator of the first motor with oil discharged by the first oil pump. The second feeding line may include a sixth passage that supplies the second stator of the second motor with oil cooled by the oil cooler.

In a non-limiting embodiment, the second motor may include: a second rotor shaft; a second rotor that rotates integrally with the second rotor shaft; and a second stator disposed concentrically with the second rotor. The second feeding line may include a seventh passage that supplies the second stator of the second motor with oil cooled by the oil cooler.

In a non-limiting embodiment, the drive unit for a hybrid vehicle may further include a splashing lubricating mechanism that supplies the differential mechanism with oil by splashing the oil by a gear coupled to between the output section and the drive wheel.

In a non-limiting embodiment, the drive unit for a hybrid vehicle may further include a storage section that stores the oil. In addition, the first feeding line may include a first upstream passage that connects the storage section and the first oil pump, the second feeding line may include a second upstream passage that connects the storage section and the second oil pump, and the first upstream passage and the second upstream passage may be independent of each other.

In a non-limiting embodiment, a differential gear may be included between the output section and the drive wheel, and the second oil pump may be driven by a torque transmitted from the differential gear.

Thus, in the embodiments of the present disclosure, a passage between from a second oil pump to a second motor in a second feeding line and a passage between from a first oil pump to a first motor and a differential mechanism in a first feeding line, are independent of each other. In other words, the first feeding line and the second feeding line are provided separately. Therefore, a check valve or the like can be omitted from a hydraulic circuit of a drive unit for a hybrid vehicle. As a result, the drive unit for a hybrid vehicle can be downsized.

In other words, the first oil pump supplies oil, via the first feeding line, only to the first motor and a planetary gear unit. Therefore, the first oil pump can be downsized. Moreover, by the first oil pump being downsized, power loss due to the first oil pump being driven by the engine can be reduced.

On the other hand, oil discharged from the second oil pump driven by rotation of a drive wheel is supplied to the first motor and the second motor via the second feeding line. Therefore, the first motor and the second motor can be cooled even in an electric vehicle mode where the engine is stopped.

Moreover, since members supplied with oil from the second oil pump are limited to the first motor and the second motor, the second oil pump can also be similarly downsized.

Furthermore, since oil discharged from the second oil pump is cooled by an oil cooler to be supplied to the first motor and the second motor, the first motor and the second motor can be effectively cooled by a small amount of oil. Therefore, the second oil pump can be further downsized.

In the electric vehicle mode, the planetary gear unit can be lubricated and cooled by a splashing lubricating mechanism.

In the drive unit for a hybrid vehicle configured so as to cool a stator of the first motor via the first feeding line, the second oil pump is used for supplying oil only to the second motor. In other words, since the second oil pump need only discharge an amount of oil required for cooling the second motor, the second oil pump can be further downsized.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
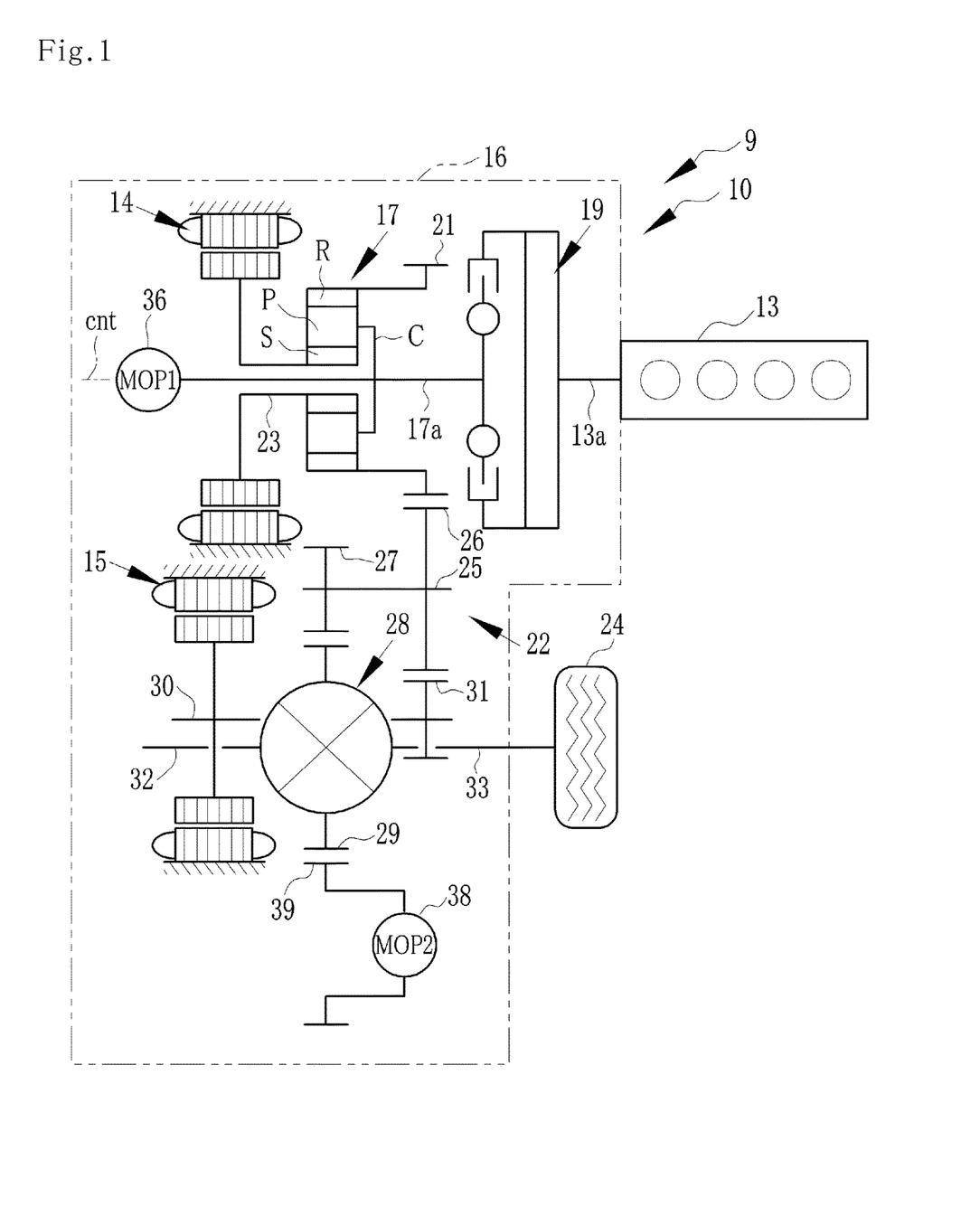
FIG. 1 is a skeleton view showing one example of a drive unit for a hybrid vehicle in an embodiment of the present disclosure.

Embodiments for carrying out the present disclosure will be described below with reference to the accompanying drawings. FIG. 1 shows one example of a drive unit for a hybrid vehicle in an embodiment of the present disclosure. As shown in FIG. 1, a hybrid vehicle (to be abbreviated as the "vehicle" hereinafter) 9 is an FF (Front-engine Front-drive) layout vehicle, and a drive unit 10 includes an engine 13 and drive wheels 24. In the drive unit 10, the likes of a first motor 14, a second motor 15, a planetary gear unit 17, and a speed reducing unit 22 are housed in a transaxle case 16, and the engine 13 is attached to the transaxle case 16.

A prime mover of the vehicle 9 includes the engine 13, the first motor 14, and the second motor 15. Each of the first motor 14 and the second motor 15 is a motor-generator that is operated not only as a motor to generate torque by applying electricity thereto, but also as a generator to generate electricity by applying torque thereto. For example, a permanent magnet synchronous motor and an AC motor such as an induction motor may be used as the first motor 14 and the second motor 15.

The engine 13 and the first motor 14 are coupled to the single pinion planetary gear unit 17. The planetary gear unit 17 serves as a power distributing mechanism to transmit distributed to the first motor 14 and an output gear 21 a drive torque generated by the engine 13. An input shaft 17a of the planetary gear unit 17 is coupled to an output shaft 13a of the engine 13 via a damper mechanism 19. The damper mechanism 19 suppresses vibration of the output shaft 13a caused by torque pulse.

The planetary gear unit 17 as a differential mechanism includes: a sun gear S; a ring gear R arranged concentrically with the sun gear S; pinion gears P interposed between the sun gear S and the ring gear R while being meshed with both gears S and R; and a carrier C supporting the pinion gears P in a rotatable manner. In the planetary gear unit 17, the carrier C is coupled to the input shaft 17a, the sun gear S is coupled to a first rotor shaft 23 of the first motor 14, and the ring gear R is coupled to the output gear 21.

In the planetary gear unit 17, the carrier C that has transmitted thereto a driving force generated by the engine 13 serves as an input element, the ring gear R outputting the driving force to the output gear 21 serves as an output element, and the sun gear S to which the first rotor shaft 23 is coupled serves as a reaction force element. In other words, the planetary gear unit 17 distributes the driving force generated by the engine 13 to the first motor 14 and to the output gear 21 as an output member. The first motor 14 controls an engine speed by generating a torque that causes a reaction force to act on the sun gear S.

The speed reducing unit 22 includes a counter shaft 25, a driven gear 26, and a first drive gear 27. The counter shaft 25 is arranged in parallel with an axis Cnt concentric with the output shaft 13a. The driven gear 26 is attached to one of end sections of the counter shaft 25 and meshes with the output gear 21, and the first drive gear 27 is attached to the other of the end sections of the counter shaft 25 and meshes with a ring gear 29 in a differential gear unit 28 as a final speed reducer. The driven gear 26 meshes also with a second drive gear 31 attached to a rotor shaft 30 in the second motor 15. A drive torque generated by the second motor 15 is synthesized, by means of the driven gear 26, with the drive torque delivered from the output gear 21, and a synthesized torque is transmitted from the differential gear unit 28 to the drive wheel 24 via drive shafts 32, 33.

A first oil pump (MOP1) 36 which is of mechanical type is provided concentrically with the output shaft 13a, and the first oil pump 36 is driven by an output torque of the engine 13. The likes of a trochoid type pump or a gear type pump, for example, may be used as the first oil pump 36.

A second oil pump (MOP2) 38 which is of mechanical type is driven by rotation of the differential gear unit 28. Specifically, the second oil pump 38 is driven by torque transmitted from a pump gear 39 that meshes with the ring gear 29. Similarly, the likes of a trochoid type pump or a gear type pump may be used as the second oil pump 38. The second oil pump 38 may be driven by any of the gears interposed between the output gear 21 and the drive wheel 24 that are rotated by a driving force transmitted from the drive wheel 24.

Figure 2:
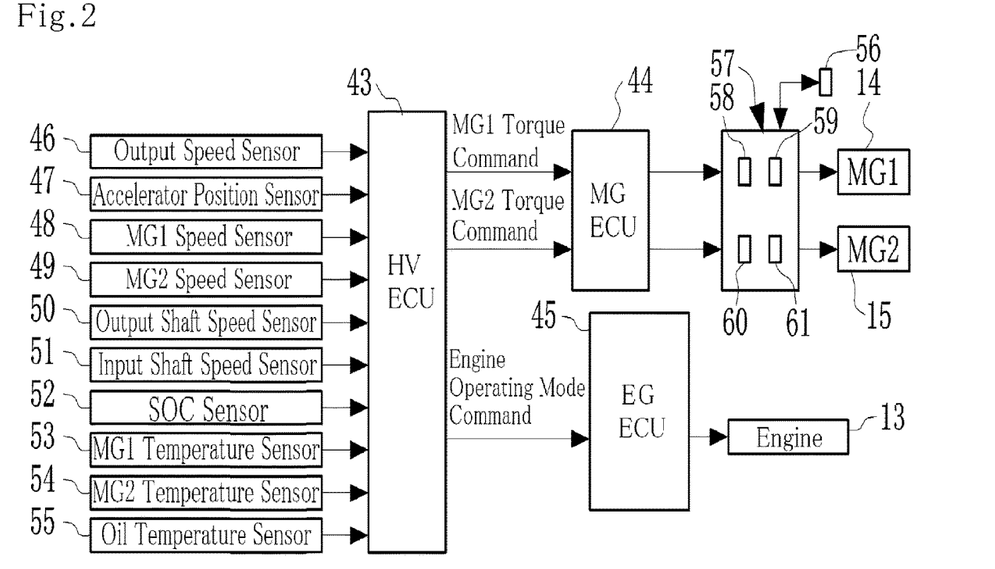
FIG. 2 is a block diagram showing one example of a controller that controls the drive unit.

FIG. 2 shows one example of a controller that controls the drive unit 10. The controller includes a hybrid electronic control unit (to be abbreviated as the "HV-ECU" hereinafter) 43, a motor electronic control unit (to be abbreviated as the "MG-ECU" hereinafter) 44, and an engine electronic control unit (to be abbreviated as the "EG-ECU" hereinafter) 45. The HV-ECU 43 has connected thereto an output speed sensor 46, an accelerator position sensor 47, an MG1 speed sensor 48, an MG2 speed sensor 49, an output shaft speed sensor 50, an input shaft speed sensor 51, an SOC sensor 52, an MG1 temperature sensor 53, an MG2 temperature sensor 54, and an oil temperature sensor 55.

The output speed sensor 46 transmits to the HV-ECU 43 a signal corresponding to a rotational speed of the output gear 21. The HV-ECU 43 calculates a vehicle speed based on a speed of the output gear 21. The accelerator position sensor 47 transmits to the HV-ECU 43 a signal related to a depression amount of an accelerator pedal (not illustrated). The MG1 speed sensor 48 transmits to the HV-ECU 43 a signal related to a rotational speed of the first motor 14. The MG2 speed sensor 49 transmits to the HV-ECU 43 a signal related to a rotational speed of the second motor 15. The output shaft speed sensor 50 transmits to the HV-ECU 43 a signal related to a rotational speed of the output shaft 13a. The input shaft speed sensor 51 transmits to the HV-ECU 43 a signal related to a rotational speed of the input shaft 17a.

The SOC sensor 52 transmits to the HV-ECU 43 a signal related to a state of charge level (to be abbreviated as the "SOC level" hereinafter) of a battery 56. The MG1 temperature sensor 53 transmits to the HV-ECU 43 a signal related to an internal temperature, for example, a temperature of a coil or a magnet, and so on, of the first motor 14. The MG2 temperature sensor 54 transmits to the HV-ECU 43 a signal related to an internal temperature, for example, a temperature of a coil or a magnet, and so on, of the second motor 15. The oil temperature sensor 55 measures a temperature of an oil accumulated in an oil pan (not illustrated) provided in the transaxle case 16 and transmits to the HV-ECU 43 a signal related to the temperature of the oil.

In order for the HV-ECU 43 to integrally control the engine 13, the first motor 14, and the second motor 15, the HV-ECU 43 includes the likes of an input/output device that transmits/receives each of the signals, a storage device (a ROM, a RAM, or the like) that stores various kinds of control programs or maps, and so on, a central processing unit (CPU) that executes the control programs, and a counter for measuring a time.

An operating mode of the vehicle 9 may be selected from a hybrid mode (to be abbreviated as the "HV mode" hereinafter) in which the vehicle 9 is powered by the engine 13, and an electric vehicle mode (to be abbreviated as the "EV mode" hereinafter) in which the vehicle 9 is powered by the second motor 15 using electric power stored in the battery 56 while stopping the engine 13. The operating mode of the vehicle 9 is switched by the HV-ECU 43. The HV mode is selected at a time of high vehicle speed or when a demanded driving force is large, for example, and the vehicle 9 runs by output torque of the engine 13 and output torque of the second motor 15. The EV mode is selected at a time of low vehicle speed or during launch, for example, and the vehicle 9 runs by output torque of the second motor 15.

The HV-ECU 43 computes a demanded driving force according to an accelerator pedal position or vehicle speed, and computes a demanded power of the engine 13 based on that demanded driving force. The HV-ECU 43 switches the operating mode so as to optimize system efficiency with respect to that demanded power. Note that a shift to the EV mode is sometimes restricted based on the temperatures of the first motor 14 and second motor 15 or the SOC level of the battery 56. The EG-ECU 45 controls the engine 13 based on a command inputted from the HV-ECU 43. When the engine speed is low and the temperature of the first motor 14 is high or when the temperature of the oil is low, the HV-ECU 43 may cause the engine speed to be raised thereby causing a discharge amount of the first oil pump 36 to be increased.

The MG-ECU 44 calculates a current value and a frequency of that current value for achieving target torques of the first motor 14 and the second motor 15, based on a command inputted from the HV-ECU 43, and outputs to a power control unit (to be abbreviated as the "PCU" hereinafter) 57 a signal including the calculated current value and its frequency. The PCU 57 includes: a first inverter 58 and a first converter 59 that perform electric power conversion between the battery 56 and the first motor 14; and a second inverter 60 and a second converter 61 that perform electric power conversion between the battery 56 and the second motor 15. The PCU 57 supplies electric power to the first motor 14 and the second motor 15, and stores in the battery 56 electric power that has been generated by the first motor 14 and the second motor 15. In other words, the second motor 15 is driven by electric power generated by the first motor 14 or electric power stored in the battery 56.

Figure 3:
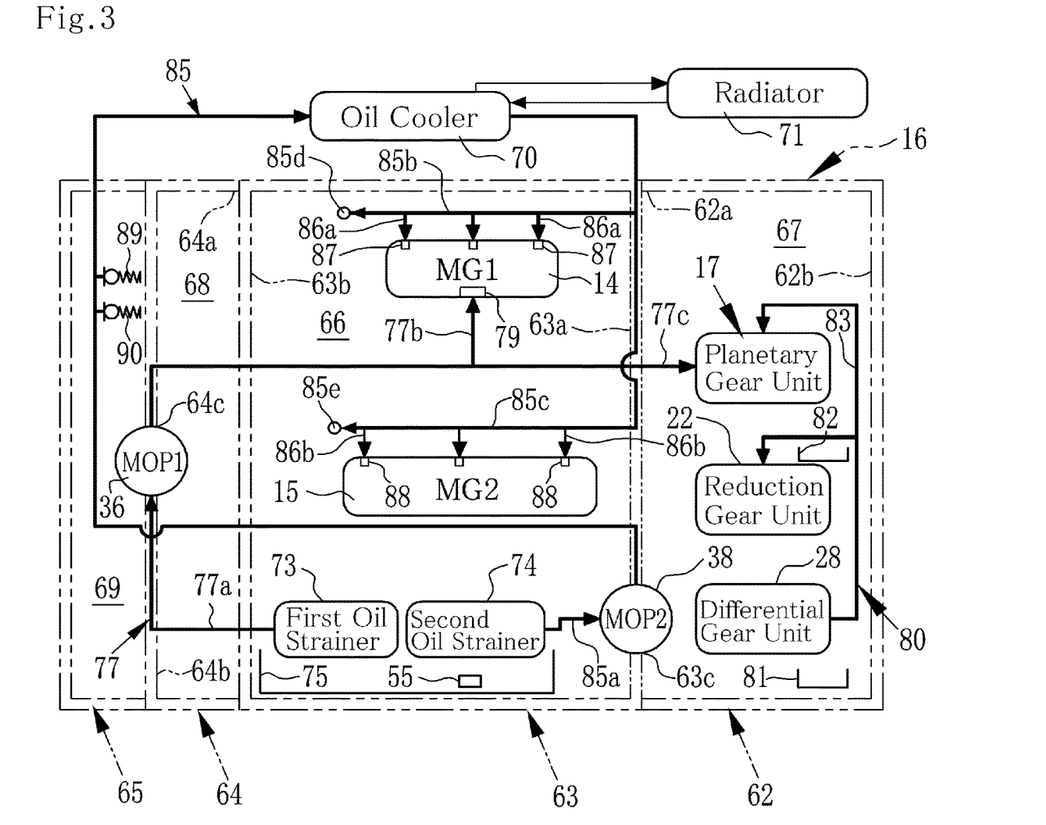
FIG. 3 is a schematic view showing one example of the drive unit.

FIG. 3 is a schematic view showing one example of a hydraulic circuit and a splashing lubricating mechanism within the transaxle case 16.

Although FIG. 3 shows each of sections schematically for explanation, a positional relationship of each of the sections may be changed according to a layout of the vehicle 9, in a range that does not change a connection relationship of a first feeding line 77 and a second feeding line 85 that will be mentioned later. Specifically, the example shown in FIG. 3 shows a configuration to be applied to the hybrid vehicle 9 of FF layout and transverse engine type in which rotating shafts of the engine 13 or gear train are provided in a vehicle width direction as shown in FIG. 1. However, the positional relationship of each of the sections may be appropriately changed in the case of application to a vehicle of vertical engine type or a vehicle of FR layout or RR layout.

As shown in FIG. 3, the transaxle case 16 includes a housing 62, a case 63, a pump body 64, and a rear cover 65. In the description below, an inside of the case 63 will be referred to as a first housing section 66, an inside of the housing 62 will be referred to as a second housing section 67, an inside of the pump body 64 will be referred to as a third housing section 68, and an inside of the rear cover 65 will be referred to as a fourth housing section 69. As mentioned above, by the engine 13 being attached to the front of the transaxle case 16, an inside of the transaxle case 16 is sealed so as to prevent oil from leaking.

The case 63 is of substantially cylindrical shape, has one of its ends closed by a first partition wall 63a, and has the other of its ends closed by a second partition wall 63b. The first housing section 66 houses the first motor 14 and the second motor 15.

The housing 62 which is of substantially cylindrical shape is attached to the case 63 so that an opening section 62a on a case 63 side of the housing 62 is closed by the first partition wall 63a of the case 63, and the housing 62 has its end section on an engine 13 side closed by a third partition wall 62b. The second housing section 67 houses the planetary gear unit 17, the speed reducing unit 22, and the differential gear unit 28. Specifically, the engine 13 is attached to the third partition wall 62b from a front side of the vehicle 9, and the output shaft 13a of the engine 13 is coupled to the input shaft 17a of the planetary gear unit 17 in the second housing section 67. The second oil pump 38 is fitted into a first installation hole 63c provided in the first partition wall 63a, so that the ring gear 29 of the differential gear unit 28 and the pump gear 39 mesh. Note that the second oil pump 38 may be housed in the first housing section 66 or the second housing section 67.

The pump body 64 which is of substantially cylindrical shape is attached to the case 63 so that an opening section 64a on the case 63 side of the pump body 64 is closed by the second partition wall 63b of the case 63, and the pump body 64 has its end section on a rear cover 65 side closed by a fourth partition wall 64b. The fourth partition wall 64b has a second installation hole 64c for the first oil pump 36 to be fitted into. However, a position of the first oil pump 36 is not limited to a specific position. For example, the first oil pump 36 may be housed in the third housing section 68 or the fourth housing section 69.

The rear cover 65 is attached to the fourth partition wall 64b of the pump body 64.

An internal temperature of the first housing section 66 is raised by the first motor 14 and the second motor 15. Internal temperatures of the second housing section 67, the third housing section 68, and the fourth housing section 69 are normally lower than the internal temperature of the first housing section 66. Therefore, the first oil pump 36, the second oil pump 38, and so on, may be provided in a low temperature housing section.

A water cooled type oil cooler 70 for cooling the oil is provided on an outside of the transaxle case 16. Note that water that has been heated in the oil cooler 70 is cooled by outside air by a radiator 71 and then returned again to the oil cooler 70. For example, the oil cooler 70 and the radiator 71 may be disposed in front of the engine 13.

A bottom section of the first housing section 66 is provided with: a first strainer 73 and a second strainer 74 for removing contamination such as metal powder that has mixed with the oil; and a first storage section (oil pan) 75 that stores the oil. The oil temperature sensor 55 for measuring the temperature of the oil is provided in the first storage section 75.

Oil is supplied from the first storage section 75 to the first motor 14 and the planetary gear unit 17 via the first feeding line 77. This first feeding line 77 is provided with the first oil pump 36 for pumping up the oil from the first storage section 75 and supplying that oil to the first motor 14 and the planetary gear unit 17. Specifically, the oil in the first storage section 75 is pumped up, via the first strainer 73 and a first upstream passage 77a, by the first oil pump 36. This first upstream passage 77a penetrates the second partition wall 63b, and further extends along the fourth partition wall 64b in a vicinity of where coupled to the first oil pump 36. Note that the first feeding line 77 may be configured by connecting a plurality of pipes, or may be configured by one pipe.

The first oil pump 36 and the first motor 14 are connected via a first downstream passage 77b of the first feeding line 77, and the first oil pump 36 and the planetary gear unit 17 are connected via a second downstream passage 77c of the first feeding line 77. Note that the first downstream passage 77b and the second downstream passage 77c may partially share the same pipe.

Specifically, part (that is, a shared section) on an upstream side of the first downstream passage 77b and the second downstream passage 77c extends along the fourth partition wall 64b, a downstream section of that part penetrates the second partition wall 63b, and the second downstream passage 77c further penetrates the first partition wall 63a.

Thus, the first oil pump 36 as a first oil pressure source makes it possible for oil to be supplied to the planetary gear unit 17 from the first storage section 75. The oil supplied to the planetary gear unit 17 drips into the speed reducing unit 22 and the differential gear unit 28 by gravitational force. As a result, oil can be supplied to the planetary gear unit 17 even when oil cannot be sufficiently splashed by the differential gear unit 28.

As will be mentioned later, the above-described first downstream passage 77b is formed on an inside of a rotor shaft 92 of the first motor 14, and the rotor shaft 92 has formed therein at least one first outlet port 111 that opens toward a first inlet port 79 formed in an inward portion of a rotor 93 of the first motor 14. The first oil pump 36 is adjusted so that a required oil amount can be discharged to the first motor 14 and the planetary gear unit 17 via the first downstream passage 77b and the second downstream passage 77c, even when the engine 13 rotates at a minimum speed. Thus, the first feeding line 77 includes: the first upstream passage 77a that connects the first strainer 73 and the first oil pump 36; the first downstream passage 77b that connects the first oil pump 36 and the first motor 14; and the second downstream passage 77c that connects the first oil pump 36 and the planetary gear unit 17. Therefore, the first downstream passage 77b serves as a "first passage" and a "fourth passage" of the present embodiment.

A splashing lubricating mechanism 80 that includes the differential gear unit 28 is housed in the second housing section 67. Specifically, the splashing lubricating mechanism 80 is configured so that oil in a second storage section 81 provided in a bottom section of the second housing section 67 is splashed by rotation of the ring gear 29 of the differential gear unit 28, and scattered oil is supplied to the speed reducing unit 22 or the planetary gear unit 17.

Specifically, the splashing lubricating mechanism 80 includes the second storage section 81, a catch tank 82, and a guide section (or groove section) 83. The second storage section 81 is provided below the ring gear 29 of the differential gear unit 28. The ring gear 29 has its lower part dipped in the oil in the second storage section 81, and, by rotating, scatters the oil. The catch tank 82 is provided more upwardly in the vehicle 9 than the second storage section 81, and stores part of the oil splashed by the ring gear 29. The guide section 83 guides the oil stored in the catch tank 82 to the speed reducing unit 22 or the planetary gear unit 17.

Thus, the splashing lubricating mechanism 80 makes it possible to supply oil to the planetary gear unit 17, the speed reducing unit 22, and the differential gear unit 28, even when running in the EV mode. Specifically, the splashing lubricating mechanism 80 may be configured so as to supply oil to shaft center portions of the pinion gears P in the planetary gear unit 17. As a result, the pinion gears P that are rotated at high speed along with increase in vehicle speed, can be lubricated and cooled.

Oil is supplied from the first storage section 75 to the first motor 14 and the second motor 15 also via the second feeding line 85. This second feeding line 85 is provided with the second oil pump 38 for pumping up the oil from the first storage section 75 and supplying that oil to the first motor 14 and the second motor 15. Specifically, the oil in the first storage section 75 is pumped up, via the second strainer 74 and a second upstream passage 85a, by the second oil pump 38. Note that the second feeding line 85 may be configured by connecting a plurality of pipes, or may be configured by one pipe.

The second oil pump 38 and the first motor 14 are connected via a third downstream passage 85b of the second feeding line 85, and the second oil pump 38 and the second motor 15 are connected via a fourth downstream passage 85c of the second feeding line 85. Note that the third downstream passage 85b and the fourth downstream passage 85c may partially share the same pipe.

Part (that is, a shared section) on an upstream side of the third downstream passage 85b and the fourth downstream passage 85c extends along the first partition wall 63a. This shared section penetrates the second partition wall 63b, the fourth partition wall 64b, and the rear cover 65 to further extend toward the oil cooler 70. That is, the shared section passes through insides of the first housing section 66, the third housing section 68, and the fourth housing section 69 and outside of the transaxle case 16 to communicate with the oil cooler 70. Note that on the inside of the first housing section 66, the shared section is disposed in a vicinity of the second motor 15.

The third downstream passage 85b extends along the first partition wall 63a so as to connect the oil cooler 70 and the first motor 14, and the fourth downstream passage 85c extends along the first partition wall 63a so as to connect the oil cooler 70 and the second motor 15.

The third downstream passage 85b further extends above the first motor 14, and its tip section 85d opens toward the inside of the first housing section 66. Moreover, a portion above the first motor 14 in the third downstream passage 85b has formed therein at least one second outlet port 86a that opens toward a second inlet port 87 formed in the first motor 14. Therefore, oil is discharged from the second outlet port 86a toward a later-mentioned stator 94 of the first motor 14, and excess oil is discharged to the first storage section 75 from the tip section 85d. Therefore, the third downstream passage 85b serves as a "second passage" of the present embodiment.

The fourth downstream passage 85c further extends above the second motor 15, and its tip section 85e opens toward the inside of the first housing section 66. Moreover, a portion above the second motor 15 in the fourth downstream passage 85c has formed therein at least one third outlet port 86b that opens toward a third inlet port 88 formed in the second motor 15. Therefore, oil is discharged from the third outlet port 86b toward a stator of the second motor 15, and excess oil is discharged to the first storage section 75 from the tip section 85e. Thus, in the vehicle 9, the first feeding line 77 and the second feeding line 85 are not in communication with each other. In other words, the first feeding line 77 and the second feeding line 85 are independent of each other.

The oil discharged from the second oil pump 38 is supplied to the oil cooler 70 via the second feeding line 85, and the oil cooled by the oil cooler 70 is supplied to the second motor 15 to cool the stator of the second motor 15. As mentioned above, the pump gear 39 of the second oil pump 38 and the ring gear 29 of the differential gear unit 28 mesh, hence the second oil pump 38 is driven by rotation of the drive wheel 24 during running of the vehicle 9. Therefore, oil can be supplied to the second motor 15 even when running in the EV mode where the engine 13 is stopped. Note that a passage connecting the oil cooler 70 and the second motor 15 in the fourth downstream passage 85c of the second feeding line 85 serves as a "third passage", a "sixth passage", and a "seventh passage" in the present embodiment.

The shared section of the third downstream passage 85b and the fourth downstream passage 85c is provided with a first relief valve 89 and a second relief valve 90 for preventing an excessive oil pressure acting on the oil cooler 70. When oil pressure exceeds a certain relief pressure, the first relief valve 89 opens whereby oil in the second feeding line 85 is discharged to be returned to the first storage section 75. For example, when the second oil pump 38 is rotated at high speed along with a rise in vehicle speed, the first relief valve 89 is opened by a rise in oil pressure in the second feeding line 85. As a result, an excessive rise in oil pressure in the second feeding line 85 is prevented, and the oil cooler 70, and so on, are protected. The second relief valve 90 is a backup relief valve for when the first relief valve 89 has failed. Note that positions of the first relief valve 89 and the second relief valve 90 are changeable provided they are in the second feeding line 85.

In the example shown in FIG. 3, the second motor 15 may be disposed more upwardly in the vehicle 9 than the first motor 14. The differential gear unit 28 may be disposed in a bottom section of the vehicle 9. The second storage section 81 and the first storage section 75 may be communicated via an unillustrated passage. As a result, the oil in the second storage section 81 can be discharged to the first storage section 75 when it exceeds a certain amount.

Figure 4:
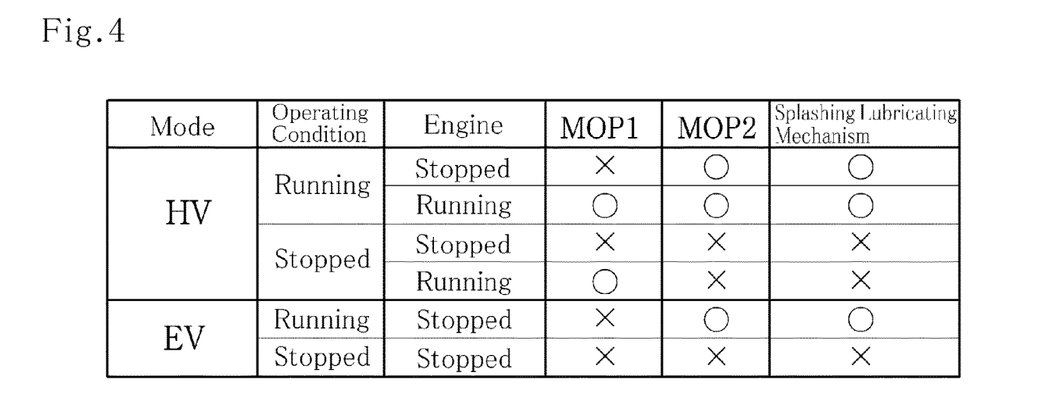
FIG. 4 is a chart showing operation of a first oil pump and a second oil pump in each operating mode.

FIG. 4 shows operation states of the first oil pump 36 and the second oil pump 38 for the operating modes. When the engine 13 has been stopped during running of the vehicle in the HV mode, the first oil pump 36 is not driven, the second oil pump 38 is driven, and the splashing lubricating mechanism 80 is activated. A similar situation is achieved even when running of the engine 13 has been stopped while the vehicle 9 is coasting.

When the engine 13 is being run during running of the vehicle in the HV mode, the first oil pump 36 and the second oil pump 38 are both driven, and the splashing lubricating mechanism 80 is activated. When running of the engine 13 has stopped during stopping of the vehicle in the HV mode, neither of the first oil pump 36 and the second oil pump 38 is driven, and the splashing lubricating mechanism 80 is not activated either.

When the engine 13 is running during stopping of the vehicle in the HV mode, the first oil pump 36 is driven, the second oil pump 38 is not driven, and the splashing lubricating mechanism 80 is not activated. A similar situation is achieved even when the vehicle 9 has stopped and the engine 13 is idling in the HV mode. When the vehicle is running in the EV mode, the first oil pump 36 is not driven, the second oil pump 38 is driven, and the splashing lubricating mechanism 80 is activated. When the vehicle has stopped in the EV mode, neither of the first oil pump 36 and the second oil pump 38 is driven, and the splashing lubricating mechanism 80 is not activated either.

Figure 5:
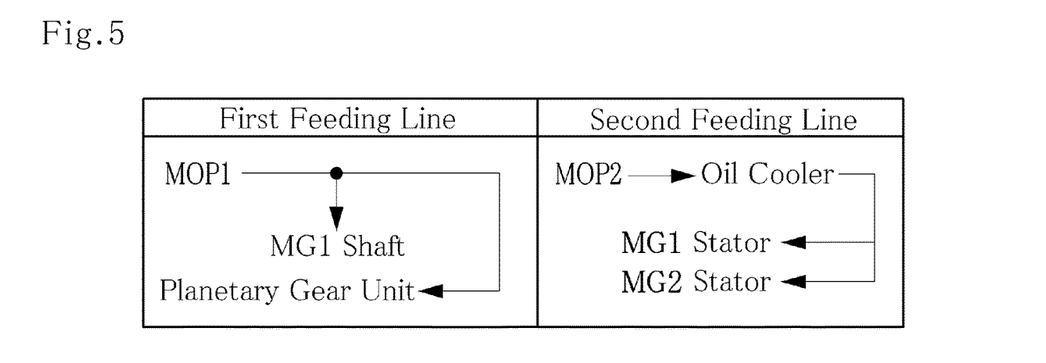
FIG. 5 is an explanatory view showing members that are supply destinations of oil discharged by the first oil pump and members that are supply destinations of oil discharged by the second oil pump.

FIG. 5 shows members supplied with oil discharged by the first oil pump 36 and members supplied with oil discharged by the second oil pump 38 in the drive unit 10. As shown in FIG. 5, the oil discharged by the first oil pump 36 is supplied, via the first feeding line 77, to the rotor shaft 92 of the first motor 14 and to the planetary gear unit 17. The oil discharged by the second oil pump 38 is supplied to the oil cooler 70 via the second feeding line 85, and the oil cooled by the oil cooler 70 is supplied to the stator 94 of the first motor 14 and to the stator of the second motor 15.

Note that a non-reversible type pump may be used as the first oil pump 36 and the second oil pump 38 in order to prevent oil from flowing back along insides of the first feeding line 77 or the second feeding line 85 while the engine 13 is stopped or the vehicle is stopped.

Figure 6:
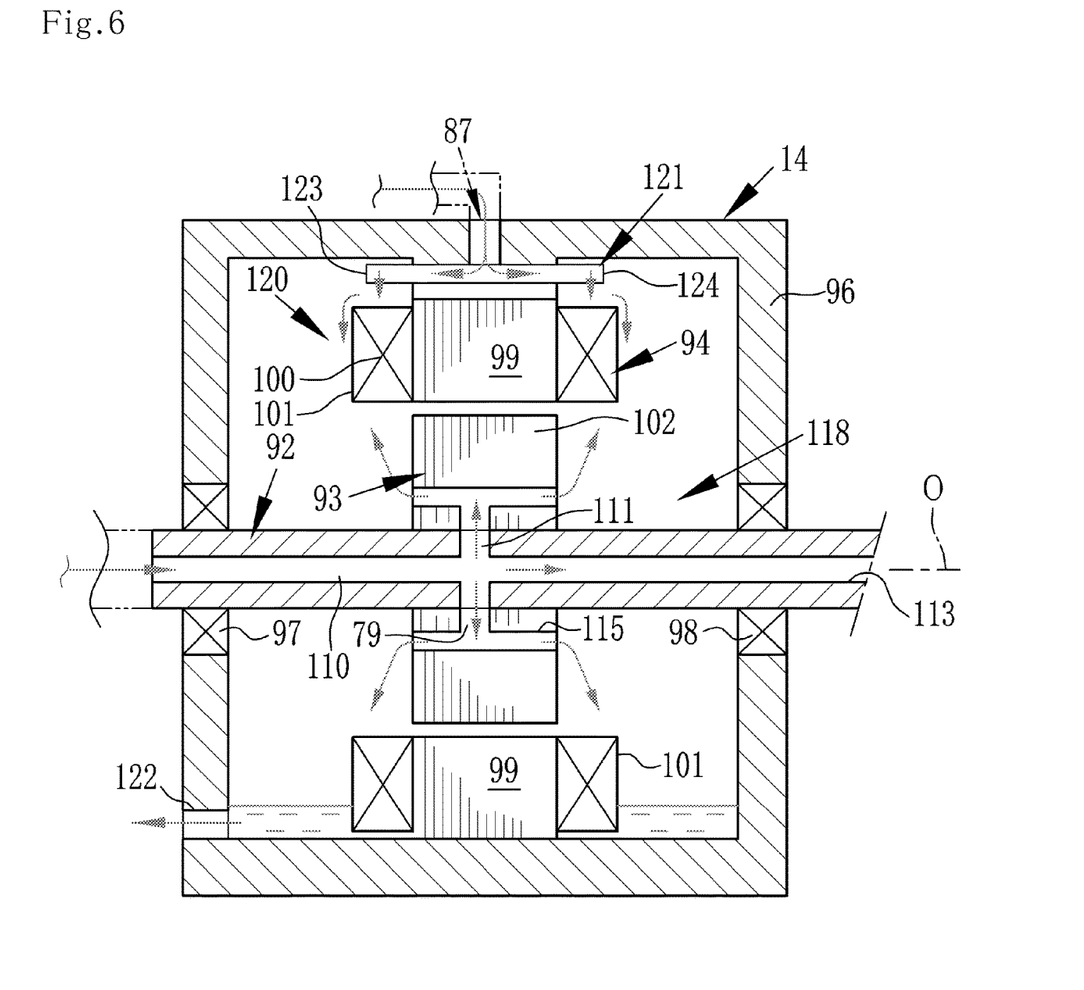
FIG. 6 is a cross-sectional view showing one example of a cooling structure of a first motor.

FIG. 6 shows enlarged a rotor cooling structure 118 for cooling the rotor 93 of the first motor 14. In the vehicle 9, a permanent magnet synchronous motor can be used as the first motor 14, for example. In the first motor 14, the rotor shaft 92, the rotor 93, and the stator 94 are housed in a motor case 96, and the rotor shaft 92 is supported in a freely rotatable manner by bearing sections 97, 98. Specifically, the rotor 93 has a permanent magnet (not illustrated) embedded in a rotor core 102 provided in the rotor shaft 92, and rotates integrally with the rotor shaft 92. The stator 94 has: a stator core 99 disposed concentrically with the rotor 93 with a certain spacing between itself and the rotor 93; a coil 100 wound on the stator core 99; and a coil end 101 projecting to both sides in an axial direction with respect to the coil 100, and is fixed to the motor case 96. The rotor 93 and the rotor shaft 92 are rotated by a current flowing in the coil 100.

Note that the coil end 101 may be covered by a resin member.

The rotor shaft 92 has: a hollow section 110 formed along a rotary central axis O of the rotor shaft 92; and a plurality of the first outlet ports 111 formed radially in a middle section of the hollow section 110. One end section of the hollow section 110 communicates with the first oil pump 36, and the other end section of the hollow section 110 has formed therein an opening section 113 that communicates with the planetary gear unit 17.

The rotor core 102 has formed therein: the first inlet port 79 into which oil flows from the first outlet port 111; and a plurality of passages 115 that penetrate the rotor core 102 in an axial direction and communicate with the first inlet port 79. In the rotor cooling structure 118, oil discharged from the first oil pump 36 to flow along the hollow section 110 flows into the passage 115, via the first outlet port 111 and the first inlet port 79, by a centrifugal force due to rotation of the rotor 93. The oil is subsequently scattered on an inside of the motor case 96 from opening sections in both ends of the passage 115.

A stator cooling structure 120 of the first motor 14 includes: at least one second inlet port 87; and a guide member 121. A plurality of the second inlet ports 87 are provided along an axial direction of the motor case 96, and the guide member 121 is attached at a position on a downstream side of the second inlet port 87 in the motor case 96. Opening sections 123, 124 are formed in both end sections of the guide member 121 in order to respectively guide oil to each of the coil ends 101. A lower section of the motor case 96 includes a drain port 122 for discharging oil to the first storage section 75.

A stator cooling structure of the second motor 15 is the same as or similar to the stator cooling structure 120 of the first motor 14 described by FIG. 6.

Thus, in the example shown in FIG. 3, the first oil pump 36 is driven by the engine 13 in the HV mode. The oil discharged from the first oil pump 36 is supplied, via the first feeding line 77, to the rotor 93 of the first motor 14 and to the planetary gear unit 17. In other words, the members supplied with oil from the first oil pump 36 are limited to the rotor 93 of the first motor 14 and the planetary gear unit 17. Therefore, the first oil pump 36 can be downsized, whereby the drive unit 10 can be downsized. Moreover, downsizing of the first oil pump 36 makes it possible to reduce power loss caused by driving the first oil pump 36.

On the other hand, during running of the vehicle in the EV mode, the second oil pump 38 is driven by rotation of the drive wheel 24. The oil discharged from the second oil pump 38 is supplied, via the second feeding line 85, to the stator 94 of the first motor 14 and to the stator of the second motor 15. Therefore, the first motor 14 and the second motor 15 can be cooled even in the EV mode where the engine 13 is stopped. Moreover, because the members supplied with oil from the second oil pump 38 are limited to the first motor 14 and the second motor 15, the second oil pump 38 can also be similarly downsized.

As mentioned above, the first feeding line 77 and the second feeding line 85 are not in communication with each other. Therefore, there is no need to provide a check valve to prevent oil being supplied from the first oil pump 36 to the stator 94 of the first motor 14 or to the second motor 15 during drive of the first oil pump 36. Similarly, there is no need to provide a check valve to prevent oil being supplied from the second oil pump 38 to the rotor 93 of the first motor 14 or to the planetary gear unit 17 during drive of the second oil pump 38, either.

Moreover, because the oil discharged from the second oil pump 38 is cooled by the oil cooler 70 to be supplied to the first motor 14 and the second motor 15, the first motor 14 and the second motor 15 can be effectively cooled by a small amount of oil. Therefore, the second oil pump 38 can be further downsized.

Figure 7:
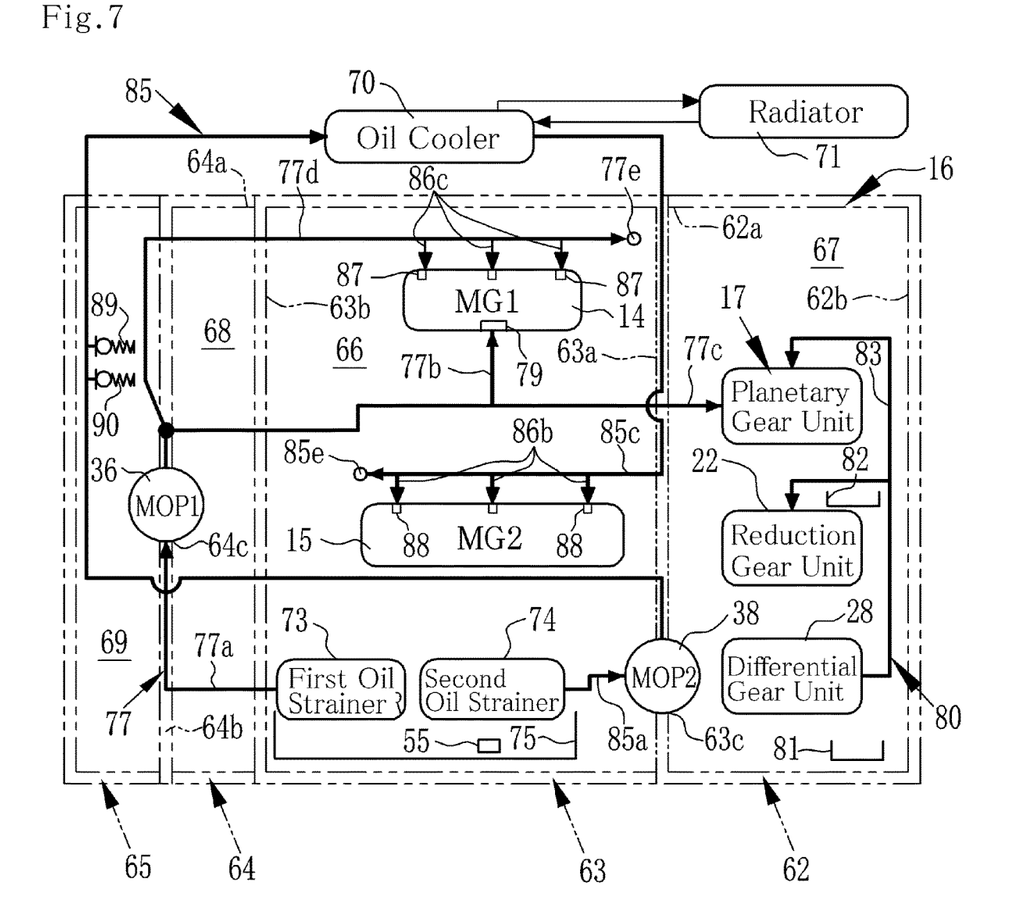
FIG. 7 is a schematic view showing another example of the drive unit.

FIG. 7 shows another embodiment of the drive unit 10 configured so as to cool the stator 94 of the first motor 14 via the first feeding line 77. As shown in FIG. 7, in the other embodiment also, the oil pumped up by the first oil pump 36 is supplied to the first motor 14 and the planetary gear unit 17 via the first feeding line 77.

In the other embodiment, the first feeding line 77 further includes a fifth downstream passage 77d, in addition to the above-mentioned first upstream passage 77a, first downstream passage 77b, and second downstream passage 77c.

Specifically, the fifth downstream passage 77d connects the first oil pump 36 and the stator 94 of the first motor 14. An upstream side in the fifth downstream passage 77d is shared with upstream sides of the first downstream passage 77b and the second downstream passage 77c. Part on a downstream side of the fifth downstream passage 77d is disposed in the fourth housing section 69, and a portion even more on the downstream side of the fifth downstream passage 77*d* extends into the first housing section 66 via the third housing section 68. That is, the fifth downstream passage 77*d* penetrates the fourth partition wall 64*b* to extend into the fourth housing section 69, a downstream side thereof penetrates the fourth partition wall 64*b* to extend into the third housing section 68, and a downstream section thereof further penetrates the second partition wall 63*b* to extend into the first housing section 66. Therefore, the fifth downstream passage 77*d* serves as a "fifth passage" of the present embodiment.

A portion extending along the inside of the first housing section 66 in the fifth downstream passage 77*d* can be configured similarly to the third downstream passage 85*b* in FIG. 3. That is, the fifth downstream passage 77*d* extends on an upper side of the first motor 14, and the fifth downstream passage 77*d* has formed therein at least one fourth outlet port 86*c* that opens toward the second inlet port 87 in the first motor 14. Furthermore, a tip section 77*e* in the fifth downstream passage 77*d* opens similarly to the tip section 85*d* of the third downstream passage 85*b*, and oil is discharged to the first storage section 75.

Note that in the other embodiment shown in FIG. 7, configurations of the first upstream passage 77*a*, the first downstream passage 77*b*, and the second downstream passage 77*c* are similar to configurations in the embodiment shown in FIG. 3.

In the other embodiment, a configuration of the second upstream passage 85*a* of the second feeding line 85 is similar to the configuration shown in FIG. 3, and the third downstream passage 85*b* is omitted in the second feeding line 85.

Figure 8:
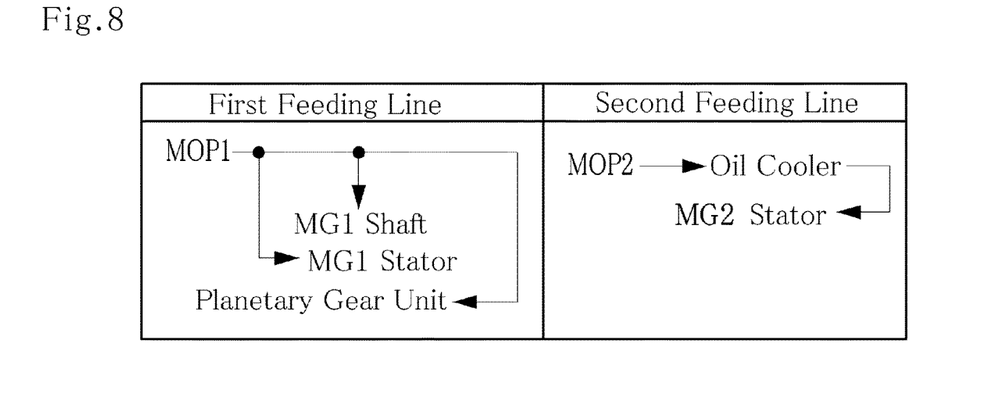
FIG. 8 is an explanatory view showing members that are supply destinations of oil discharged by a first oil pump and members that are supply destinations of oil discharged by a second oil pump in the drive unit shown in FIG. 7.

FIG. 8 shows members supplied with oil discharged by the first oil pump 36 and members supplied with oil discharged by the second oil pump 38 in the drive unit 10 according to the other embodiment. As shown in FIG. 8, the oil discharged by the first oil pump 36 is supplied, via the first feeding line 77, to the rotor shaft 92 and stator 94 of the first motor 14 and to the planetary gear unit 17. The oil discharged by the second oil pump 38 is supplied to the oil cooler 70 via the second feeding line 85, and the oil cooled by the oil cooler 70 is supplied to the stator of the second motor 15.

As mentioned above, in the EV mode, the vehicle 9 shown in FIG. 1 is driven only by the second motor 15, and the first motor 14 stops. In the other embodiment shown in FIG. 7, the second oil pump 38 is used to supply oil only to the second motor 15. Therefore, in the EV mode, the second oil pump 38 need only discharge an oil amount required to cool the second motor 15, and an even smaller sized pump may be adopted as the second oil pump 38.

Although the above exemplary embodiments of the present application have been described, it will be understood by those skilled in the art that the present application should not be limited to the described exemplary embodiments, and various changes and modifications can be made within the spirit and scope of the present application. For example, the second oil pump 38 may be configured so as to be driven by any of gears in the speed reducing unit 22, instead of by the ring gear 29 in the differential gear unit 28.

Moreover, the oil discharged from the second oil pump 38 may be supplied, via the second downstream passage 77*c*, to a rotor of the second motor 15, instead of or in addition to being supplied to the stator of the second motor 15.

In each of the above-described embodiments, there is a risk that when the vehicle 9 reverses, the second oil pump 38 rotates in reverse, whereby air is sucked in from a side of second lubricating passages 86. In order to prevent such reverse rotation of the second oil pump 38, a one-way clutch may be provided in the second oil pump 38. Alternatively, there may be used a pump that includes a mechanism for switching the inlet port and the outlet port in response to the vehicle 9 being set to a reverse mode. Furthermore, there may be used as the second oil pump 38 a pump that includes a mechanism capable of inverting a rotating direction of an impeller of the oil pump with respect to a rotating direction of the drive wheel, in response to a running direction.

Moreover, at least part of the first upstream passage 77*a*, the second upstream passage 85*a*, the first downstream passage 77*b*, the second downstream passage 77*c*, the third downstream passage 85*b*, the fourth downstream passage 85*c*, and the fifth downstream passage 77*d* may be a piping, a through hole, a pipeline, or a combination of these.

What is claimed is:

1. A drive unit for a hybrid vehicle, comprising:
   an engine that generates a driving force;
   a first motor having an electric power generation function;
   an output section coupled to a drive wheel;
   a differential mechanism that distributes to the first motor and to the output section the driving force generated by the engine;
   a second motor coupled to the output section and generating a driving force by supply of electric power;
   a first oil pump driven by power of the engine, the first oil pump thereby discharging oil;
   a second oil pump driven by a torque transmitted from the output section, the second oil pump thereby discharging oil;
   a first feeding line for supplying the first motor and the differential mechanism with oil discharged from the first oil pump; and
   a second feeding line for supplying the second motor with oil discharged from the second oil pump, the oil discharged from the second oil pump being supplied to the second motor via an oil cooler that cools the oil,
   wherein a passage from the second oil pump to the second motor in the second feeding line and a passage from the first oil pump to the first motor and the differential mechanism in the first feeding line, are independent of each other.

2. The drive unit for a hybrid vehicle according to claim 1, wherein
   the first motor comprises: a first rotor shaft; a first rotor that rotates integrally with the first rotor shaft; and a first stator disposed concentrically with the first rotor,
   the second motor comprises: a second rotor shaft; a second rotor that rotates integrally with the second rotor shaft; and a second stator disposed concentrically with the second rotor,
   the first feeding line comprises a first downstream passage that supplies the first rotor of the first motor with oil discharged by the first oil pump, and
   the second feeding line comprises: a third downstream passage for supplying the first stator of the first motor with oil cooled by the oil cooler; and a fourth downstream passage that supplies the second stator of the second motor with oil cooled by the oil cooler.

3. The drive unit for a hybrid vehicle according to claim 1, wherein
   the first motor comprises: a first rotor shaft; a first rotor that rotates integrally with the first rotor shaft; and a first stator disposed concentrically with the first rotor, the second motor comprises: a second rotor shaft; a second rotor that rotates integrally with the second rotor shaft; and a second stator disposed concentrically with the second rotor, the first feeding line comprises: a first downstream passage that supplies the first rotor of the first motor with oil discharged by the first oil pump; and a fifth downstream passage that supplies the first stator of the first motor with oil discharged by the first oil pump, and the second feeding line comprises a fourth downstream passage that supplies the second stator of the second motor with oil cooled by the oil cooler.

4. The drive unit for a hybrid vehicle according to claim 1, wherein the second motor comprises: a second rotor shaft; a second rotor that rotates integrally with the second rotor shaft; and a second stator disposed concentrically with the second rotor, and the second feeding line comprises a fourth downstream passage that supplies the second stator of the second motor with oil cooled by the oil cooler.

5. The drive unit for a hybrid vehicle according to claim 2, further comprising:

a splashing lubricating mechanism that supplies the differential mechanism with oil by splashing the oil by a gear coupled to between the output section and the drive wheel.

6. The drive unit for a hybrid vehicle according to claim 1, further comprising:

a storage section that stores the oil, wherein the first feeding line comprises a first upstream passage that connects the storage section and the first oil pump, the second feeding line comprises a second upstream passage that connects the storage section and the second oil pump, and the first upstream passage and the second upstream passage are independent of each other.

7. The drive unit for a hybrid vehicle according to claim 1, wherein a differential gear is included between the output section and the drive wheel, and the second oil pump is driven by a torque transmitted from the differential gear.

* * * * *